United States Patent
Hatanaka

(10) Patent No.: US 6,202,782 B1
(45) Date of Patent: Mar. 20, 2001

(54) VEHICLE DRIVING METHOD AND HYBRID VEHICLE PROPULSION SYSTEM

(76) Inventor: Takefumi Hatanaka, 1-5-4, Jindaiji, Mitakashi, Tokyo (JP)

(*) Notice: Subject to any disclaimer, the term of this patent is extended or adjusted under 35 U.S.C. 154(b) by 0 days.

(21) Appl. No.: 09/304,481

(22) Filed: May 3, 1999

(51) Int. Cl.[7] ................................................. B60K 5/00
(52) U.S. Cl. ................ 180/301; 60/39.1; 60/39.161; 60/39.181; 60/39.182; 180/302
(58) Field of Search ..................... 60/39.1, 39.161, 60/39.181, 39.182; 180/65.2, 301, 302

(56) References Cited

U.S. PATENT DOCUMENTS

| | | | |
|---|---|---|---|
| 3,808,802 | * 5/1974 | Tanasawa | 60/39.161 X |
| 4,030,288 | * 6/1977 | Davis et al. | 60/39.181 |
| 4,286,430 | * 9/1981 | Smith | 60/39.161 X |
| 4,373,326 | * 2/1983 | Smale | 60/39.161 |
| 4,592,204 | * 6/1986 | Rice | 60/39.161 |
| 4,685,286 | * 8/1987 | Hetzer et al. | 60/39.161 X |
| 4,823,546 | * 4/1989 | Cheng | 60/39.161 X |
| 4,870,817 | * 10/1989 | Conn | 60/39.161 |
| 4,893,466 | * 1/1990 | Egnell et al. | 60/39.161 |
| 4,899,537 | * 2/1990 | Cheng | 60/39.161 |
| 5,081,832 | * 1/1992 | Mowill | 60/39.161 |
| 5,253,472 | * 10/1993 | Dev | 60/39.161 |
| 5,465,569 | * 11/1995 | Althaus et al. | 60/39.161 |
| 5,553,448 | * 9/1996 | Farrell et al. | 60/39.161 |
| 5,794,431 | * 8/1998 | Utamura et al. | 60/39.182 X |
| 5,839,269 | * 11/1998 | Frutschi | 60/36.182 X |
| 5,884,470 | * 3/1999 | Frutschi | 60/39.182 |
| 5,887,418 | * 3/1999 | Bruckner et al. | 60/39.182 X |
| 5,896,738 | * 4/1999 | Yang et al. | 60/39.182 X |
| 5,906,095 | * 5/1999 | Frutschi et al. | 60/39.182 X |
| 5,918,466 | * 7/1999 | Cloyd et al. | 60/39.182 X |
| 5,979,156 | * 11/1999 | Uematsu et al. | 60/39.182 |
| 6,089,024 | * 7/2000 | Hatanaka | 60/39.182 X |
| 6,098,398 | * 8/2000 | Uematsu et al. | 60/39.182 |

* cited by examiner

*Primary Examiner*—Lanna Mai
*Assistant Examiner*—Toan To
(74) *Attorney, Agent, or Firm*—Jordan and Hamburg LLP

(57) ABSTRACT

A vehicle driving method and hybrid propulsion system are disclosed. In the vehicle driving method and hybrid propulsion system, a heat engine is intermittently operated to provide a first power output and hot exhaust. A heat recovery unit containing thermal storage means is utilized to recover and store waste of hot exhaust, thereby enabling continuous production of motive gases during non-operation period of the heat engine. An expansion turbine is coupled to the heat engine and expands the motive gases to produce a second power output in a continuous fashion. The vehicle is driven by the first and second power outputs. A control unit operates the heat engine in an on/off mode to intermittently supply the hot exhaust to heat recovery unit, thereby providing remarkable fuel economy with reduced pollutants.

17 Claims, 12 Drawing Sheets

VEHICLE DRIVING METHOD AND HYBRID VEHICLE PROPULSION SYSTEM

BACKGROUND OF THE INVENTION

1. Field of the Invention

This invention relates to hybrid vehicles and, more particularly, to driving methods and hybrid propulsion systems for vehicles.

2. Description of the Related Art

U.S. Pat. No. 3,979,913 discloses a system for increasing the efficiency of an internal combustion engine (I C E) by converting the waste energy to drive a turbine. Output power from the turbine is used to supplement the basic power of the engine.

U.S. Pat. No. 4,300,353 discloses a hybrid vehicle propulsion system which utilizes an I C E, an afterburner, and a steam engine in combination for improved efficiency and reduced emission of pollutants.

U.S. Pat. No. 5,191,766 discloses a hybrid engine which utilizes the heat from the exhaust gases of I C E to generate steam externally of the cylinders of the engine. The steam is used to power turbines to supplement the engine.

U.S. Pat. No. 5,327,987 discloses a hybrid-propulsion car system having one axle driven by I C E and another axis driven by an electric motor. The waste heat of I C E is recovered by the engine cooling fluid, and is then heat exchanged with an evaporative fluid in a closed circuit. The evaporative fluid is vaporized by the heat of the engine cooling fluid to power a turbine which in turn drives an electric generator.

In conventional hybrid propulsion systems discussed above, the internal combustion engines consume fuel in continuous fashion during various phases of engine operation. Various attempts have been made to further improve the fuel consumption and reduce emission of pollutants. However, none of these attempts have achieved both of these requirements. Since, further, the steam turbines combined with the I C Es have low efficiency, the waste energy can not be fully recovered. Thus, the engines become large in size and the hybrid propulsion systems become complicated in structure.

SUMMARY OF THE INVENTION

It is, therefore, an object of the present invention to provide a method of driving a vehicle, which method can overcomes the shortcomings encountered in prior art.

It is another object of the present invention to provide a hybrid propulsion system which is simple in structure, high in efficiency and low in manufacturing cost.

It is a further object of the present invention to provide a hybrid propulsion system for energy efficient and low emission vehicles.

It is still another object of the present invention to provide a hybrid propulsion system which enables vehicles to run 100 km per liter at greater fuel efficiency than required by PNGV (Partnership for a New Generation of Vehicles) in U.S.A.

A further object of the present invention is to provide a hybrid propulsion system for a low emission vehicle which can achieve a new low emission vehicle regulation known as "LEV II" which starts from the year 2004 in U.S.A.

BRIEF DESCRIPTION OF THE DRAWINGS

Referring now to FIG. 1, there is shown a preferred embodiment of hybrid propulsion system 10 embodying a vehicle driving method according to the present invention. In FIG. 1, hybrid propulsion system 10 is shown as being adopted in hybrid vehicle 12. Propulsion system 10 comprises radiator 16 cooled by motor fan 14, a heat engine composed of gas turbine 18 and drive unit 20 drivably connected to output shaft 26.

Figure 1:
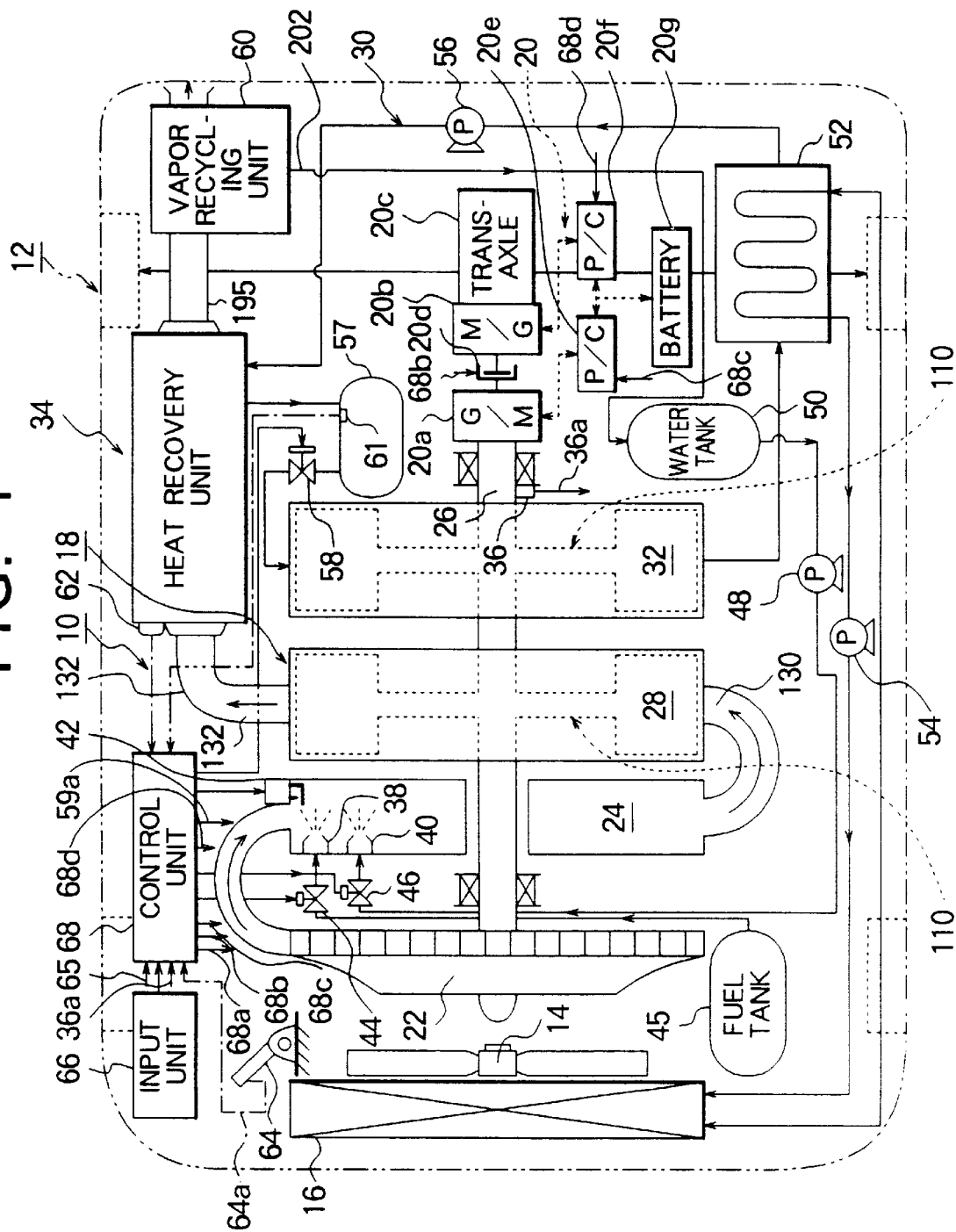
FIG. 1 is a schematic diagram of a hybrid propulsion system according to the invention.

Gas turbine 18 comprises compressor 22, combustor 24 for producing first motive gases, primary flywheel turbine 28 coupled to compressor 22, secondary flywheel turbine 32 coupled to primary turbine 28 and a heat recovery unit 34 which recovers and stores heat of hot exhaust from primary turbine 28 to produce second motive gases.

Combustor 24 includes fuel injection nozzle 38, water injection nozzle 40 and ignition plug 42. Fuel injection nozzle 38 is supplied with fuel via fuel supply valve 44 connected to fuel tank 45. Water injection nozzle 40 is supplied with water via water supply valve 46 connected to water tank 50 via high pressure pump 48. Heat recovery unit 34 is disposed in a closed circuit 30, which includes condensor 52 for condensing expanded gases emitting from second turbine 32, high pressure pump 56, accumulator 57 and pressure control valve 58.

Closed circuit 30 is filled with organic evaporative fluid composed of, for example, methanol containing 12 percent of ammonium by volume having a melting temperature of −85° C. and boiling temperature of 50° C. This evaporative fluid has a liquid phase at a temperature below 50° C. and a gas phase at a temperature above 50° C. The gas phase has the pressure levels 20 bar, 100 bar, 330 bar, 400 bar and 500 bar at temperatures of 130°, 215°, 260°, 270° and 280° C., respectively. In another example, the evaporative fluid may be replaced with carbon dioxide having critical values at a temperature of 31.35° C. and at a pressure of 75.3 kg/cm². Carbon dioxide may be filled in the closed circuit 30 so as to maintain the expanded gases at the pressure above 80 kg/cm², with the expanded gases composed of $CO_2$ is converted to liquid by applying a coolant of 35° C. to condenser 52. In this case, heat recovery unit 34 is maintained at a temperature of 65° to 80° C. At the temperature of 65° C., the motive gases has the pressure of 180 kg/cm² and are stored in accumulator 57. Pressure control valve 58 is designed to adjust the motive gases at the pressure of 170 kg/cm² to be applied to second turbine 32. The expanded gases emitting from second flywheel turbine 32 has the temperature of 50° C. and the pressure of 80 kg/cm². In another modification, a mixture of $CO_2$ and the organic fluid discussed above may be employed.

The coolant is recirculated by pump 54 between radiator 16 and condenser 52 so as to control the temperature around 30° to 35° C. The waste heat is recovered by heat recovery unit 34 and water vapor contained in the exhaust gases is recycled by vapor recycle unit 60 which returns water to reservoir tank 50.

Figure 10:
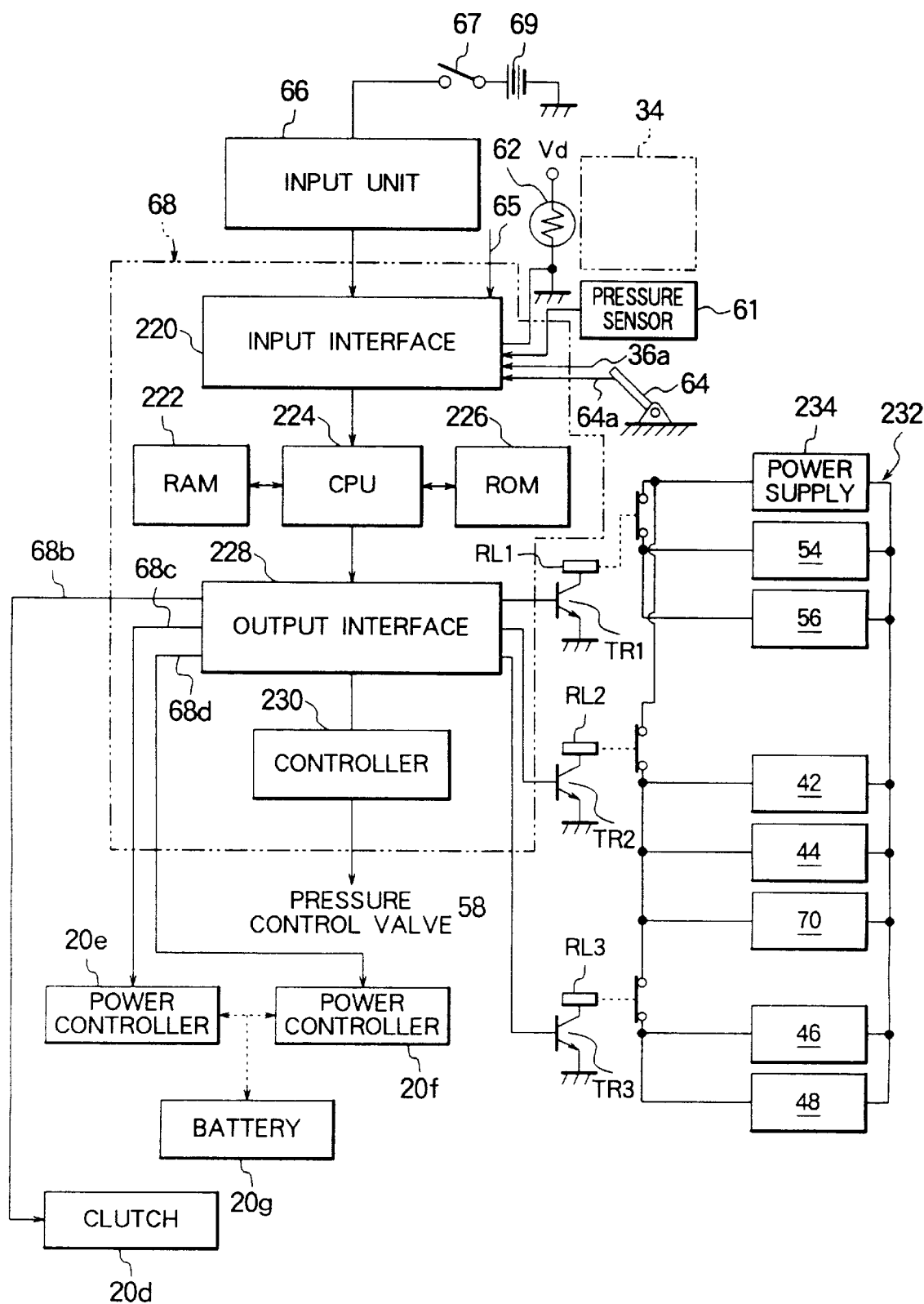
FIG. 10 is a block diagram of a control unit shown in FIG. 1.

Turning now to FIG. 1, hybrid propulsion system 10 further comprises temperature sensor 62 for producing a temperature signal indicative of operating temperature of heat recovery unit 34, manual operator 64 such as accelerator pedal for producing a peak power demand signal during a peak power demand or heavy load, input device 66 to input various reference data related to temperatures, pressures, vehicle speeds etc, and control unit 68 connected via key switch 67 (see FIG. 10) to power supply 69 (see FIG. 10). Control unit 68 is also connected to a brake pedal (not shown) to receive a brake signal 65 therefrom. Control unit 68 is designed to generate various control signals to control clutch 20d, ignition plug 42, fuel supply valve 44, water supply valve 46, high pressure pump 48, circulation pump 54, high pressure pump 56, throttle drive motor 70 (see FIG. 2) and other electronic devices discussed below.

In FIG. 1, drive unit 20 forming part of hybrid propulsion system 10 comprises generator/motor 20a coupled to output shaft 26, motor/generator 20b connected to drive wheels via trans-axle 20c, clutch 20d designed to selectively couple generator/motor 20a to motor/generator 20b, first and second power converters 20e and 20f, and battery means 20g serving as an electric accumulator which may also include a bank of capacitors. Each of power converters 20e and 20f comprises circuits for an inverter function to convert DC from battery means 20g to AC and a rectifier function to convert AC power output to DC. The output power generated by generator/motor 20a is converted from AC to DC by power converter 20e and is either used to drive motor/generator 20b or recharge battery 20g. Since motor/generator 20b is normally energized by generator/motor 20a via power converters 20e and 20f, battery 20g can be smaller in size and battery cost can be remarkably reduced. Control unit 68 responds to peak demand signal 64a to generate control signal 68b to energize clutch 20d to mechanically couple generator/motor 20a to motor/generator 20b to provide additional power output from flywheel turbines 28 and 32 thereto for supplementing the basic power of motor/generator 20b. During normal operation of vehicle 12, viz., light load conditions, power converter 20e serves as the rectifier by signal 68c while power converter 20f serves as the inverter by signal 68d. When brake signal 65 is applied to control unit 68, however, power converter 20f serves as the rectifier to rectify AC output from motor/generator 20b to DC to recharge battery 20g, which is also recharged by power converter 20e. During start-up of vehicle 12, power converter 20e serves as the inverter to start up gas turbine 18 via generator/motor 20a. Control unit 68 may also be designed to respond to speed signal 36a produced by speed sensor 36 for thereby intermittently operating gas turbine 18 when the speed of output shaft 26 reaches 80 percent of its maximum speed produced by flywheel turbine 28.

Figure 2:
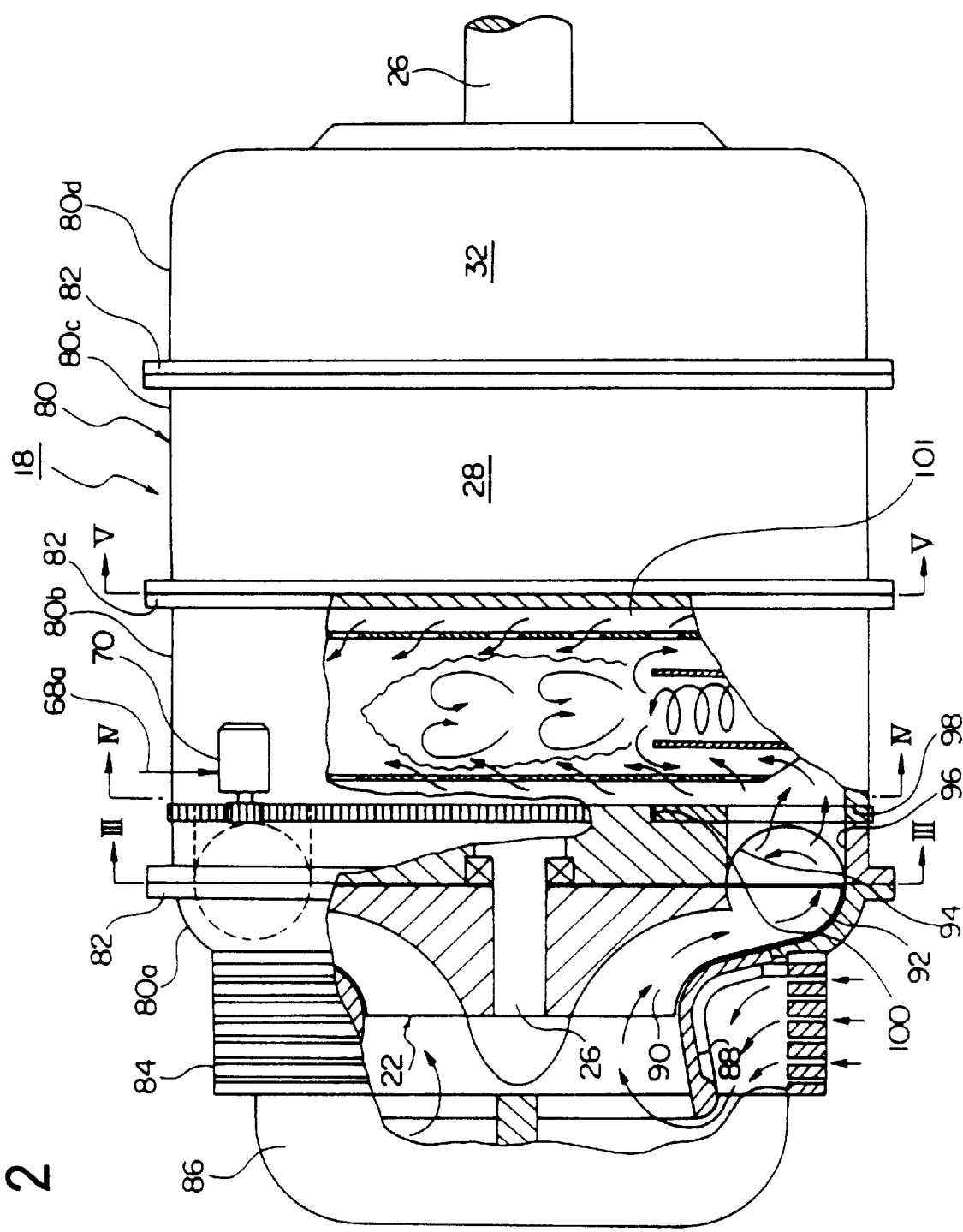
FIG. 2 is a schematic view, partly in cross section, of a gas turbine employed in the system of FIG. 1.

Turning now to FIG. 2, there is shown a detailed structure of gas turbine 18. Gas turbine 18 comprises turbine housing 80 which is, for ease of access, formed in a plurality of removable sections 80a to 80d which are bolted together at flanges 82. Annular air filter 84, in combination with dome-like noise suppressor 86, is provided at one end of turbine housing 80. The air filter 84 surrounds outwardly flaring mouth section 88 of the air inlet for air compressor 22. The compressor 22 may be multi-state and may be of the centrifugal, or axial type, or of any other suitable type. As shown, compressor 22 comprises a centrifugal impeller 90 of customary configuration and is mounted on the leftward end of output shaft 26. Compressor 22 also comprises a plurality of chamber blades 92 circumferentially spaced from one another to serve as a secondary compressing means, and first and second arcuate side channels 94 each having a semi-circular shape in cross section to enable further compression of air (see FIGS. 2 and 3). First and second arcuate openings 96 are symmetrically formed in housing section 80b between side channels 94. Throttle 98 has a disk shape and is rotatably mounted on annular shoulder 100 of housing section 80b to adjust the opening of arcuate opening 96. Throttle 98 has its outer periphery formed with gears adapted to be driven by motor 70 responsive to control signal 68a output from control unit 68 (see FIG. 1). Housing section 80b also has an annular chamber 101, in which combustor 24 is disposed.

Figure 3:
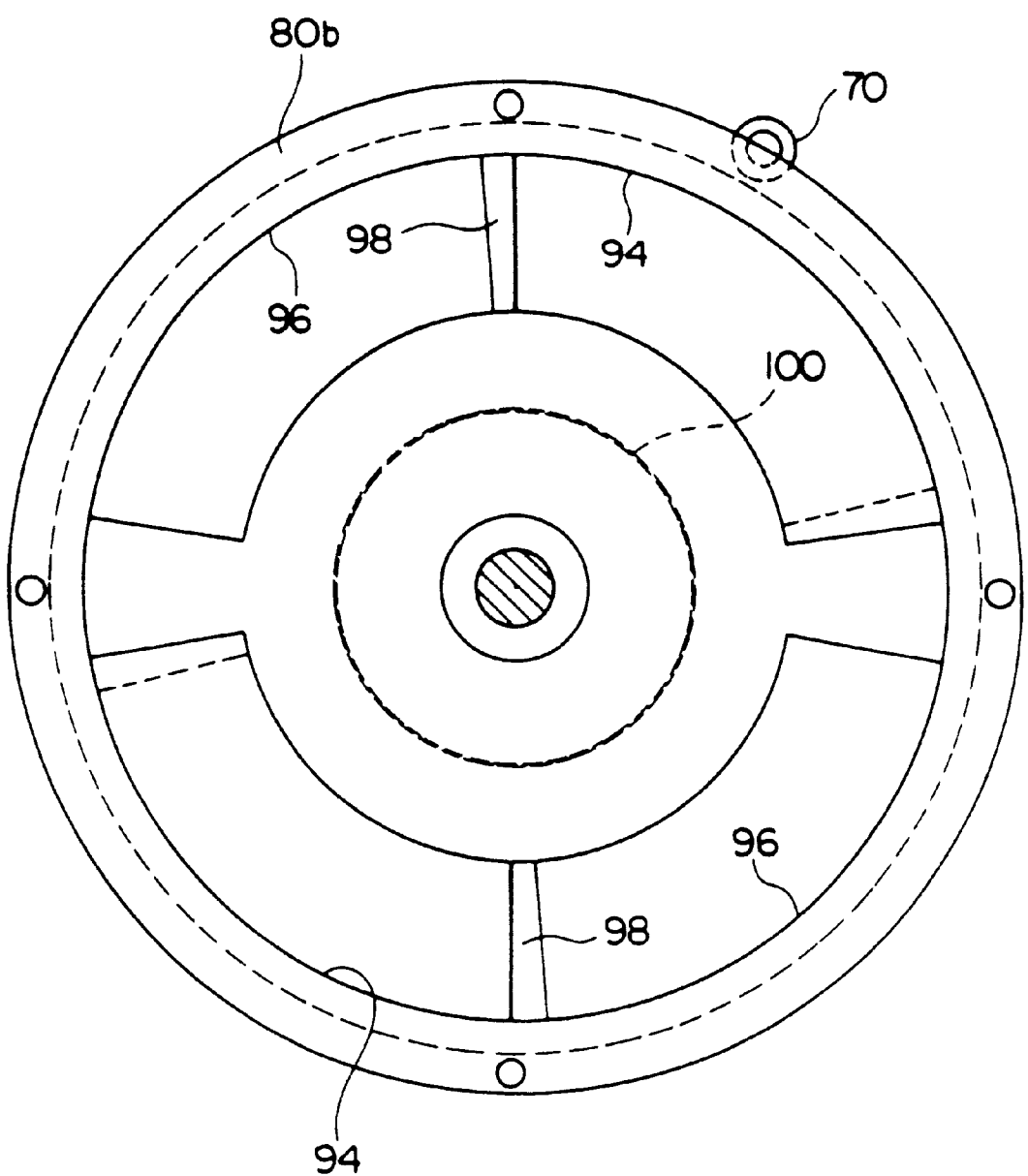
FIG. 3 is a cross sectional view taken on line III—III of FIG. 2.
Figure 4:
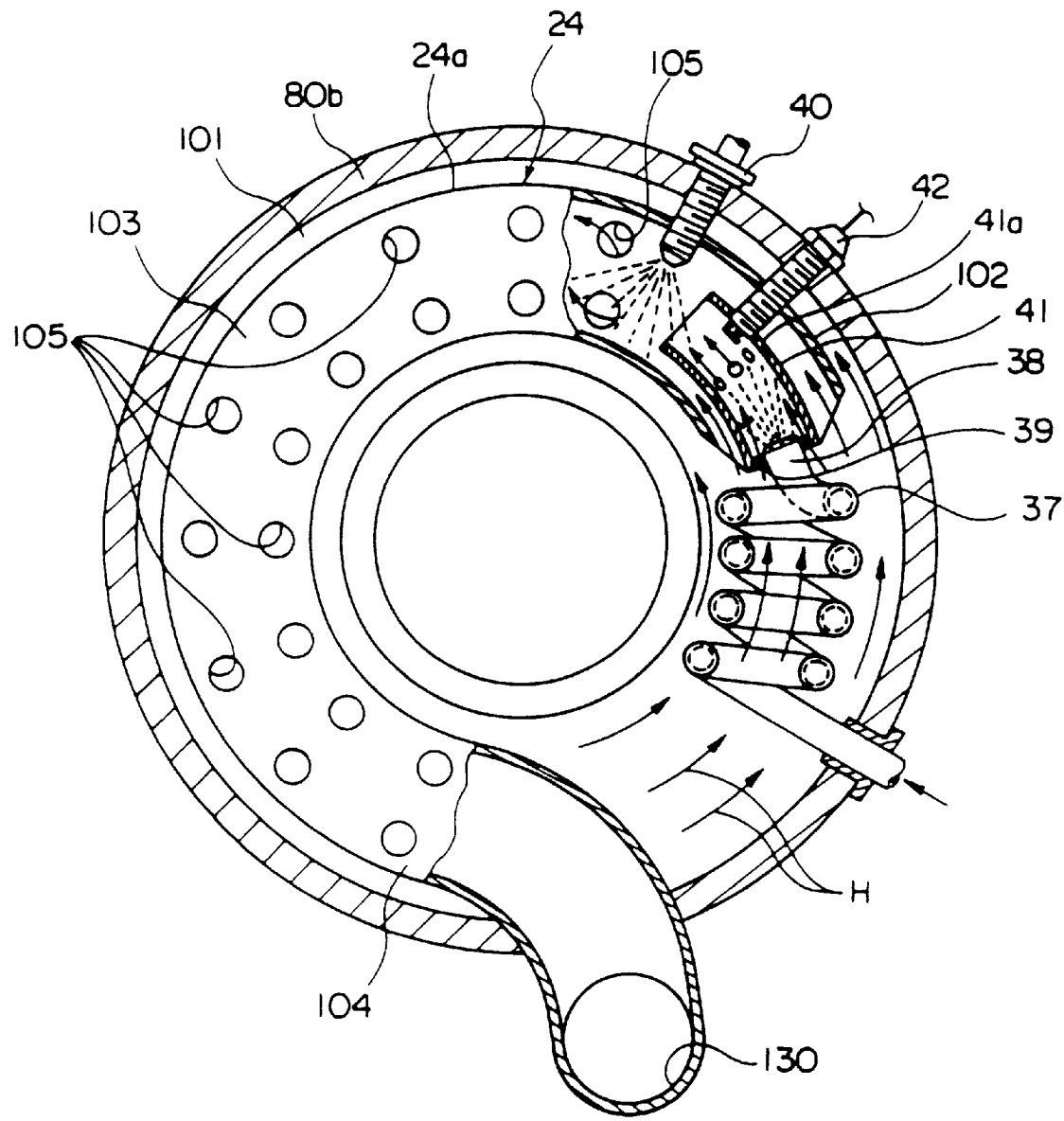
FIG. 4 is a cross sectional view taken on line IV—IV of FIG. 2.

In FIGS. 3 and 4, combustor 24 comprises a substantially semi-circular liner having combustion chamber 24a, which has leading section 102, intermediate section 103 and trailing section 104, each having a plurality of air holes 105. Leading section 102 has pre-evaporation and pre-mixing duct 41 supporting swirler 39 and fuel injection nozzle 38. Duct 41 also has a plurality of apertures 41a to introduce preheated compressed air thereinto, and ignition plug 42. Fuel nozzle 38 is connected to heating tube 37 placed in annular chamber 101 and fuel in tube 37 is pre-heated by heated air H. Pre-heated fuel is injected from nozzle 38 and impinges upon the inner wall of duct 41 by which fuel is evaporated to be mixed with pre-heated air to form uniform air/fuel mixture, which is ignited by ignition plug 42 to produce combustion gases as primary motive gases. Water or water vapor is injected into water injection nozzle 40 to lower combustion temperature to reduce Nox pollutants while producing high pressure vapor to remarkably increase the mass of the combustion products for thereby increasing the power output of primary turbine 28. The primary motive gases thus produced is delivered through outlet 130 into primary turbine 28.

Figure 5:
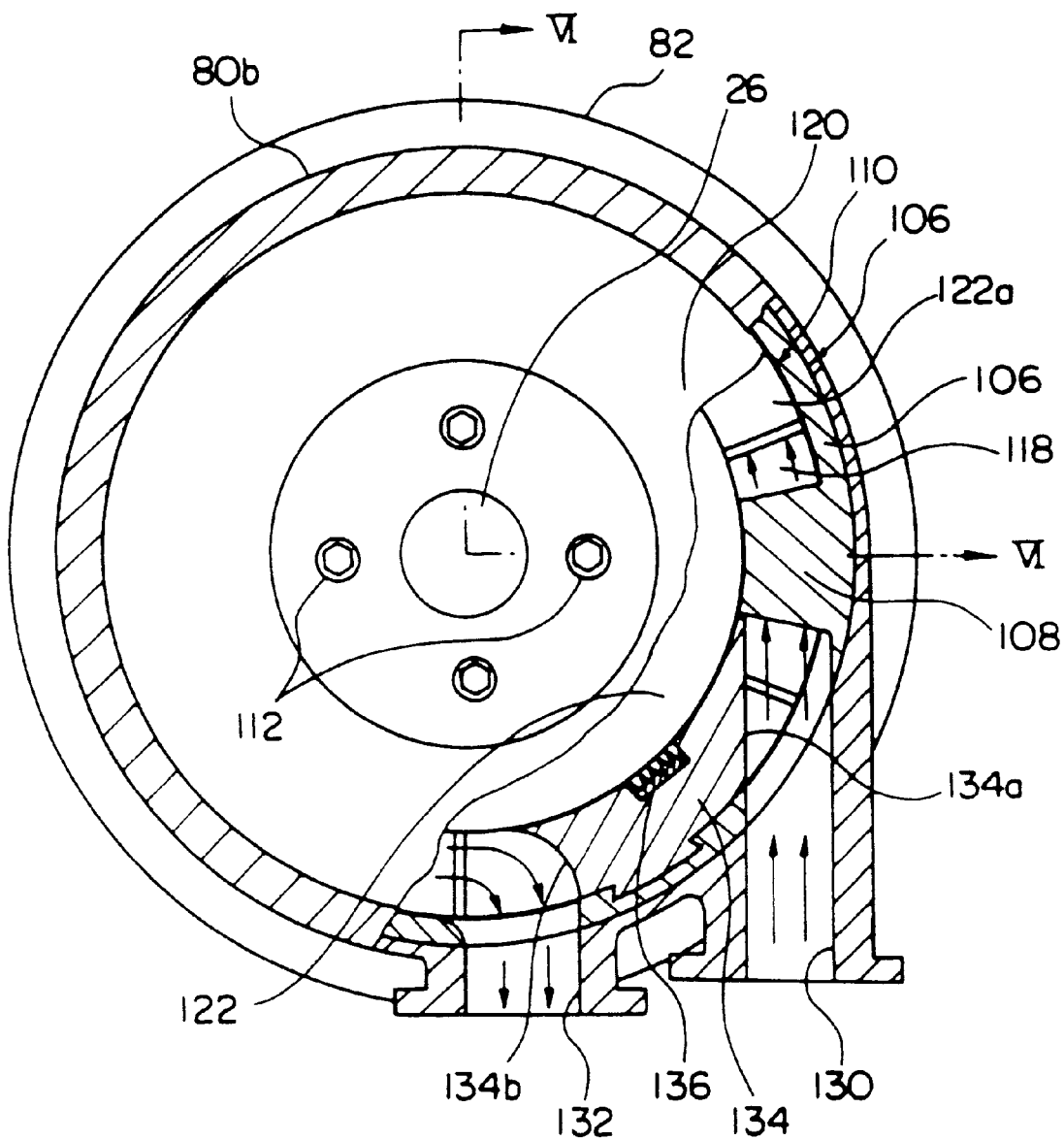
FIG. 5 is a cross sectional view taken on line V—V of FIG. 2.
Figure 6:
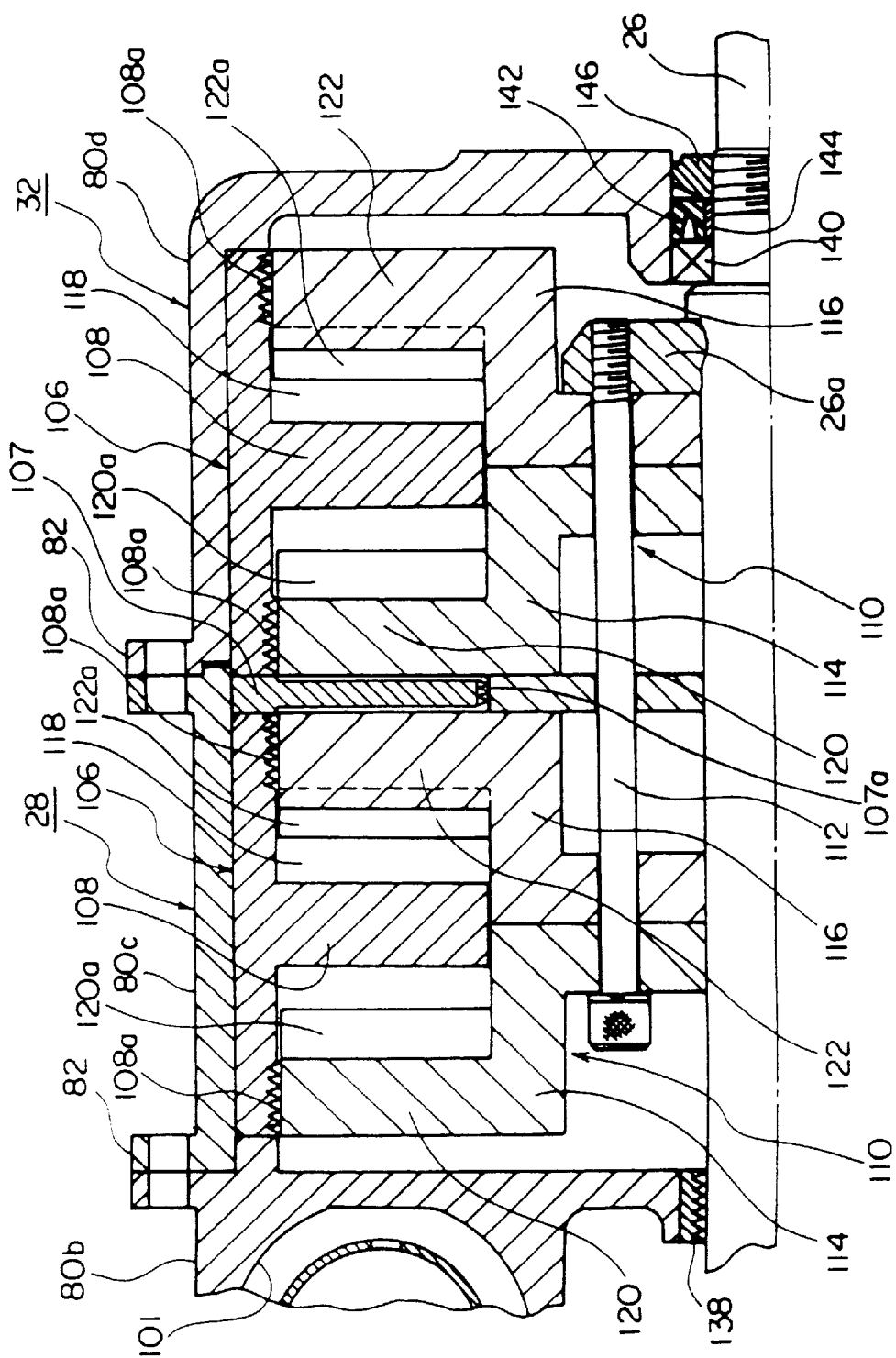
FIG. 6 is a cross sectional view taken on line VI—VI of FIG. 5.
Figure 7:
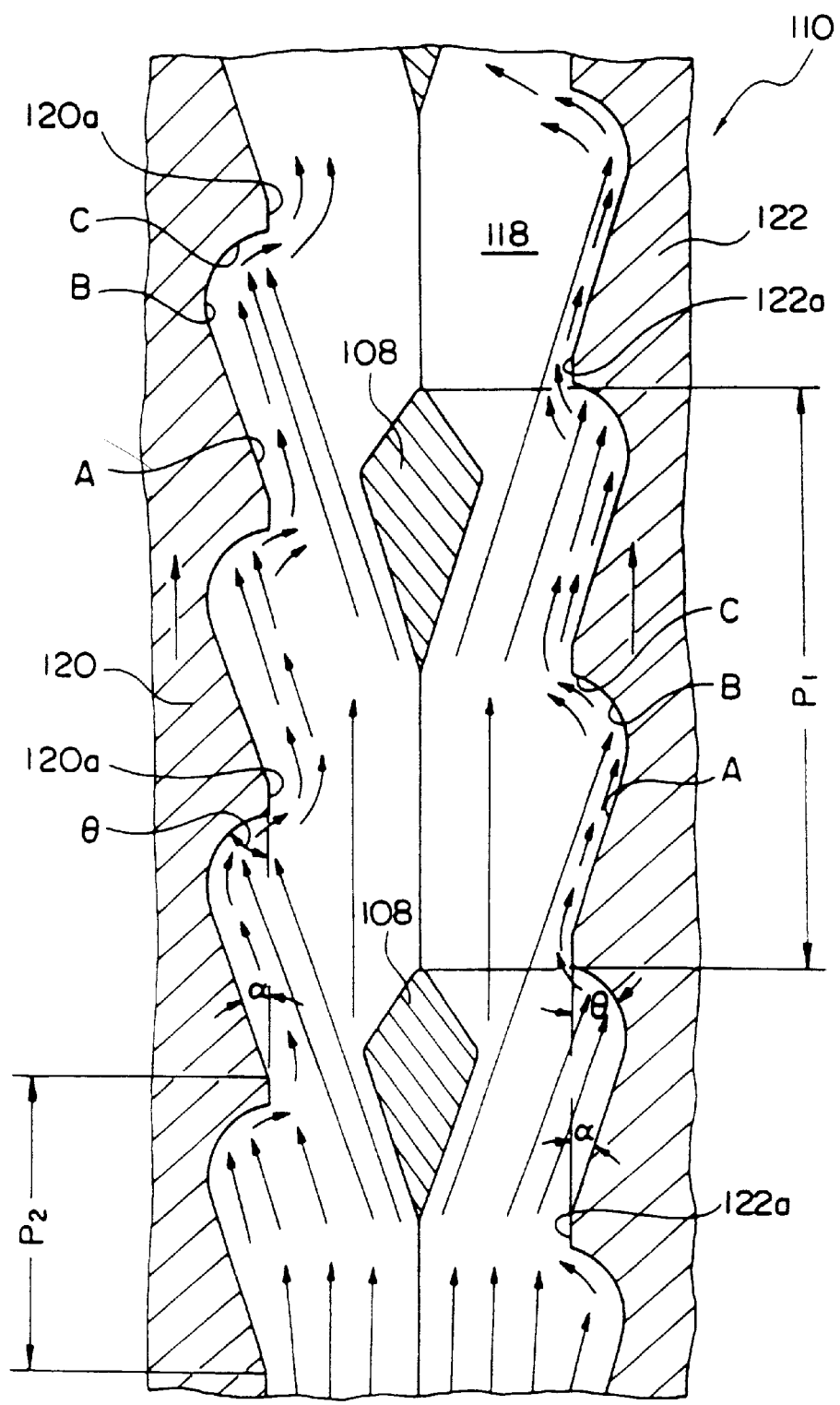
FIG. 7 is a schematic diagram showing the relationship between the stator and the turbine.

FIGS. 5, 6 and 7 show a detailed structure of primary and secondary flywheel turbines 28 and 32. Primary and secondary turbines 28 and 32 comprise annular stators 106 which are fixedly mounted in turbine sections 80c and 80d, respectively, in axially spaced and concentric relationship. Spacer ring 107 is sandwiched between stators 106 and has its inner wall provided with labyrinth seal 107a engaging an outer periphery of an annular spacer ring supported by output shaft 26. Each of annular stators 106 has a plurality of radially and inwardly extending flow deflectors 108 which are circumferentially spaced, and a pair of labyrinth seals 108a formed at ends of stator 106. As seen in FIG. 5, each annular stator 106 also has inlet 130 to introduce a jet stream of motive gases in a tangential direction, outlet 132 to exhaust expanded gases, and flow interrupter or partition member 134 having guide surfaces 134a and 134b. Flow interrupter 134 has labyrinth seal 136.

Primary and secondary turbines 28 and 32 also comprise primary and secondary flywheel turbines each including a turbine rotor 110 composed of a pair of rotor disks 114 and 116 which are fixedly coupled to flange 26a via bolt 112.

Rotor disks 114 and 116 have radially extending annular walls 120 and 122, respectively, which define an annular jet stream path 118 which accommodates therein flow deflectors 108. Annular walls 120 and 122 have pluralities of circumferentially spaced turbine blades 120a and 122a, respectively, which are displaced from one another by a half pitch. As shown in FIG. 7, each turbine blade has a first surface extending parallel to a deflecting surface of flow deflector 108 and slanted at an acute angle a relative to annular path 118, working or intermediate surface B upon which the jet stream impinges to apply a drive force to flywheel turbine 110, and a trailing edge C slanted at an angle relative to annular path 118 for guiding the jet stream from the working surface B toward annular path 118. Flow deflectors 108 have a pitch P1 and turbine blades have a pitch P2 smaller than P1.

In FIG. 6, housing section 80b has its radial wall provided with labyrinth seal 138 in dose proximity with an intermediate portion of output shaft 26 having its right end rotatably supported by bearing 140. Seal 142 is mounted on sleeve 144 fitted to output shaft 26, and screw 146 is screwed to output shaft 26 to hold seal 142 in fixed place.

Figure 8:
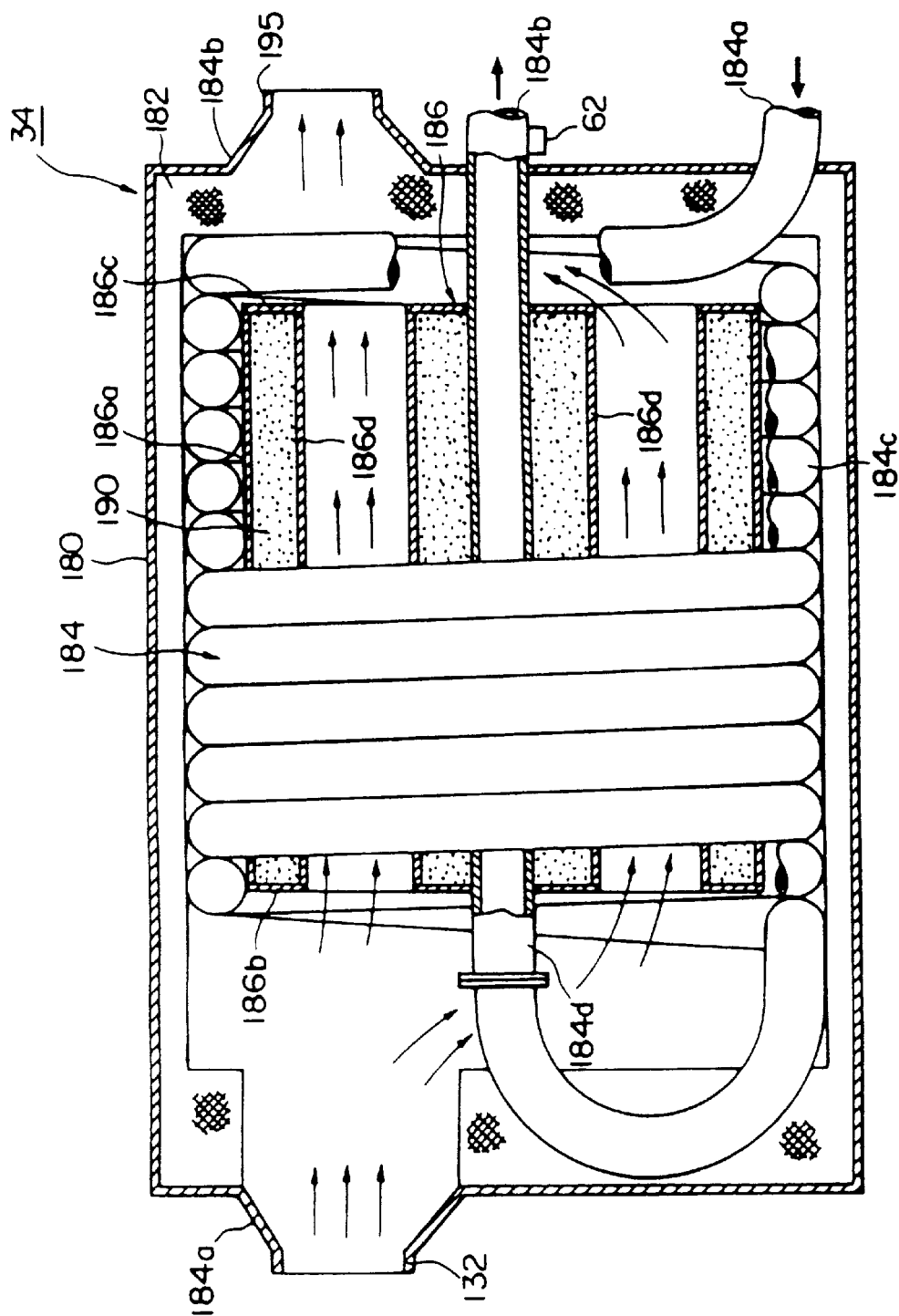
FIG. 8 is a sectional view of a heat recovery unit shown in FIG. 1.

Referring now to FIG. 8, there is shown a detailed structure of heat recovery unit (HRU) 34 of FIG. 1. HRU 34 comprises cylindrical housing 180, heat insulation material 182 disposed in housing 180, evaporating tubing 184 and thermal storage unit 186. Housing 180 is formed with inlet 184a to admit the hot exhaust gases and outlet 184b to deliver the exhaust gases to the exhaust duct 195. Due to this flow of exhaust gases, thermal storage unit 186 recovers and stores waste heat of the hot exhaust and icnreases its temperature in a range between 130°–280° C. The evaporating tubing 184 has inlet 184a to admit the evaporative fluid composed of, for example, the organic mixture liquid discussed above, outlet 184b to feed high pressure vapor, spiral coils of tubing 184c disposed between heat insulating material 182 and thermal storage unit 186, and central tubing 184d. Thermal storage unit 186 is comprised of a shell assembly made up of outer tubular wall 186a in closed contact with spiral coils 184c, first and second end plates 186b and 186c and a plurality of inner tubular walls 186d which are symmetrical about the axis of shell assembly 186. Shell assembly 186 encloses a shell cavity which is filled with thermal storage material. In a preferred embodiment, the thermal storage material may be composed of a mixture of a solid magnesium oxide MgO and molten salt of sodium nitrate $NaNO_3$. This mixture has a thermal storage capacity sixty times greater than that of water per unit volume. Central tubing 184d centrally extends through the shell cavity of thermal storage unit 186.

Figure 9:
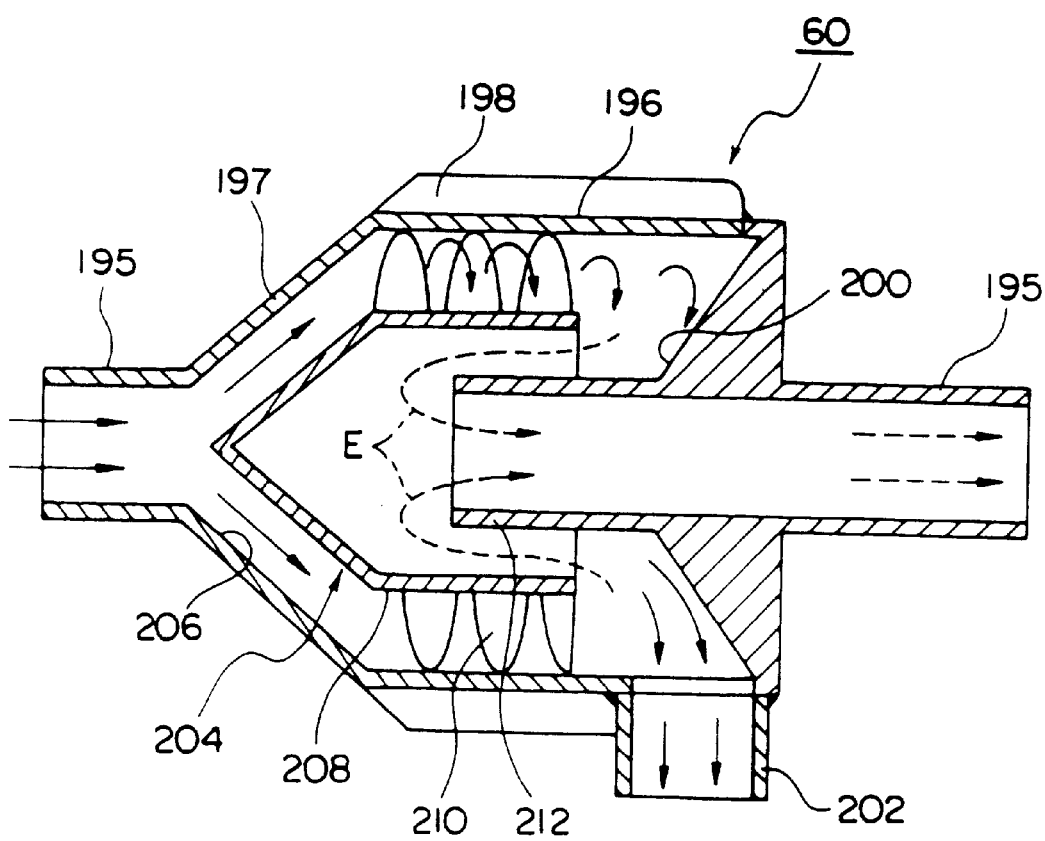
FIG. 9 is a cross sectional view of a vapor recycling unit shown in FIG. 1.

FIG. 9 shows a detailed structure of vapor recycle unit (VRU) 60 shown in FIG. 1. VRU 60 comprises cooling casing 196 connected to exhaust pipe 195. Cooling casing 196 includes cone-shape section 197 extending from pipe 195, a plurality of cooling fins 198, cone-shape trap 200, and outlet 202. Cone-shape member 204 is enclosed in casing 196 in concentric fashion to provide cone-shape passage 206 and has spirals 210 to cause spiral flow of hot exhaust flowing through passage 206. Heavy particles such as vapor, or some pollutants contained in the hot exhaust are forced to contact with a cold internal surface of casing 196 and, thus, the vapor is condensed to water in casing 196. Water and other particles including particles are returned to water reservoir tank 50. Accordingly, clean exhaust is emitted via pipe 195 to atmosphere. A suitable filtering unit may be attached to outlet 202 to remove the particles contained in condensed water.

FIG. 10 shows a block diagram of control unit 68 of FIG. 1. Control unit 68 is connected via input device 66 and key switch 67 to power supply 69. Control unit comprises input interface 220, RAM 222, CPU 204, ROM 226, output interface 228 and proportionate controller 230. Input interface 220 is connected to temperature sensor 62, pressure sensor 61, the brake pedal (not shown) and manual operator 64 to receive temperature signals T1 and T2 indicative of 130° and 180° C., respectively, a pressure signal, speed signal 36a and peak power demand signal 64a. Output interface 228 is coupled to control circuit 232, and power controllers 20e and 20f. Controller 230 is designed to actuate pressure control valve 58 in proportion to the level of pressure signal. Control circuit 232 includes power supply 234, transistor TR1 for controlling pumps 54 and 56, transistor TR2 for controlling ignition plug 42, fuel supply valve 44 and motor 70, and transistor TR3 for controlling water supply valve 46 and high pressure pump 48.

Figure 11:
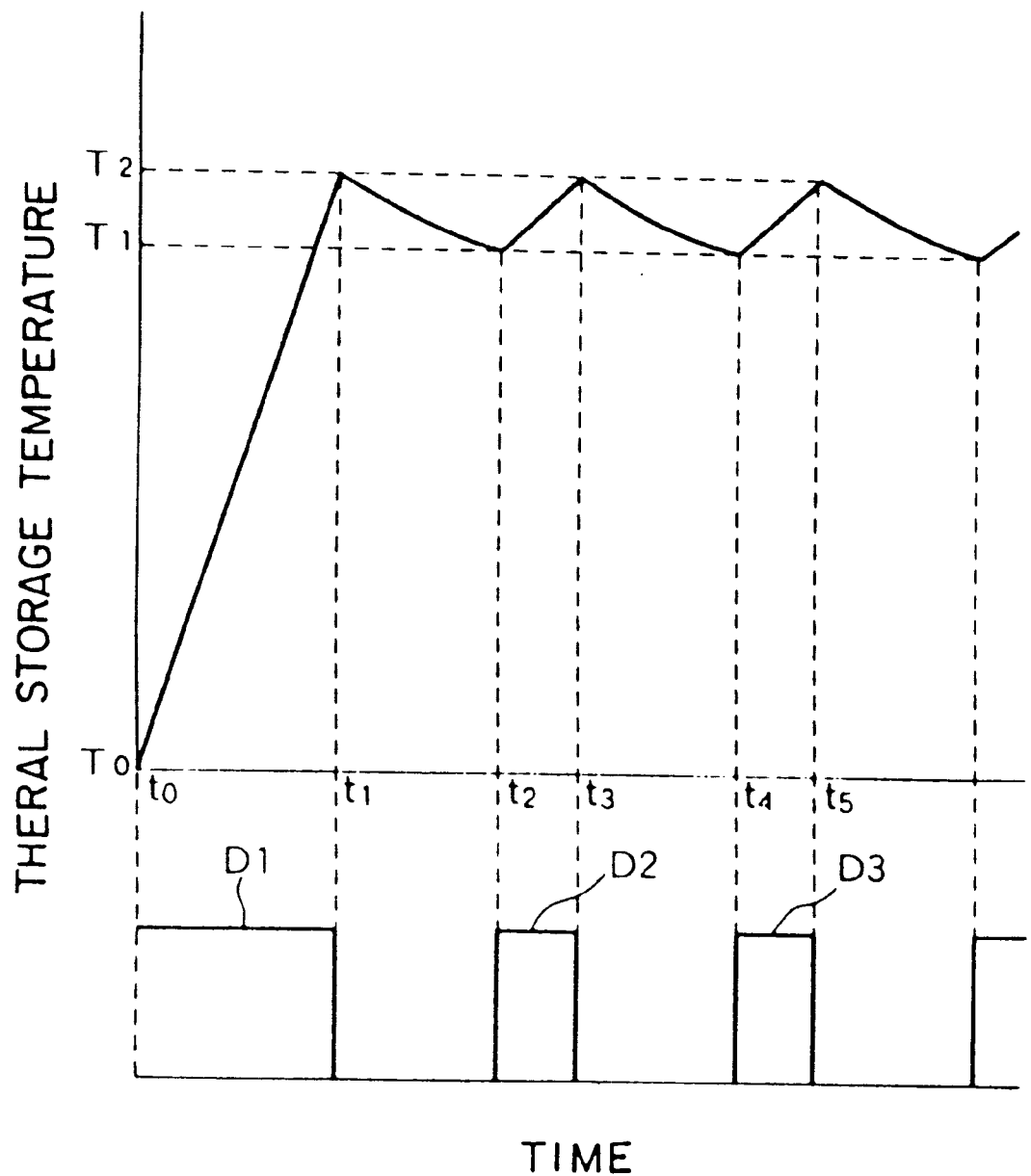
FIG. 11 is a diagram showing the relationship between the storage temperature and operating time.
Figure 12:
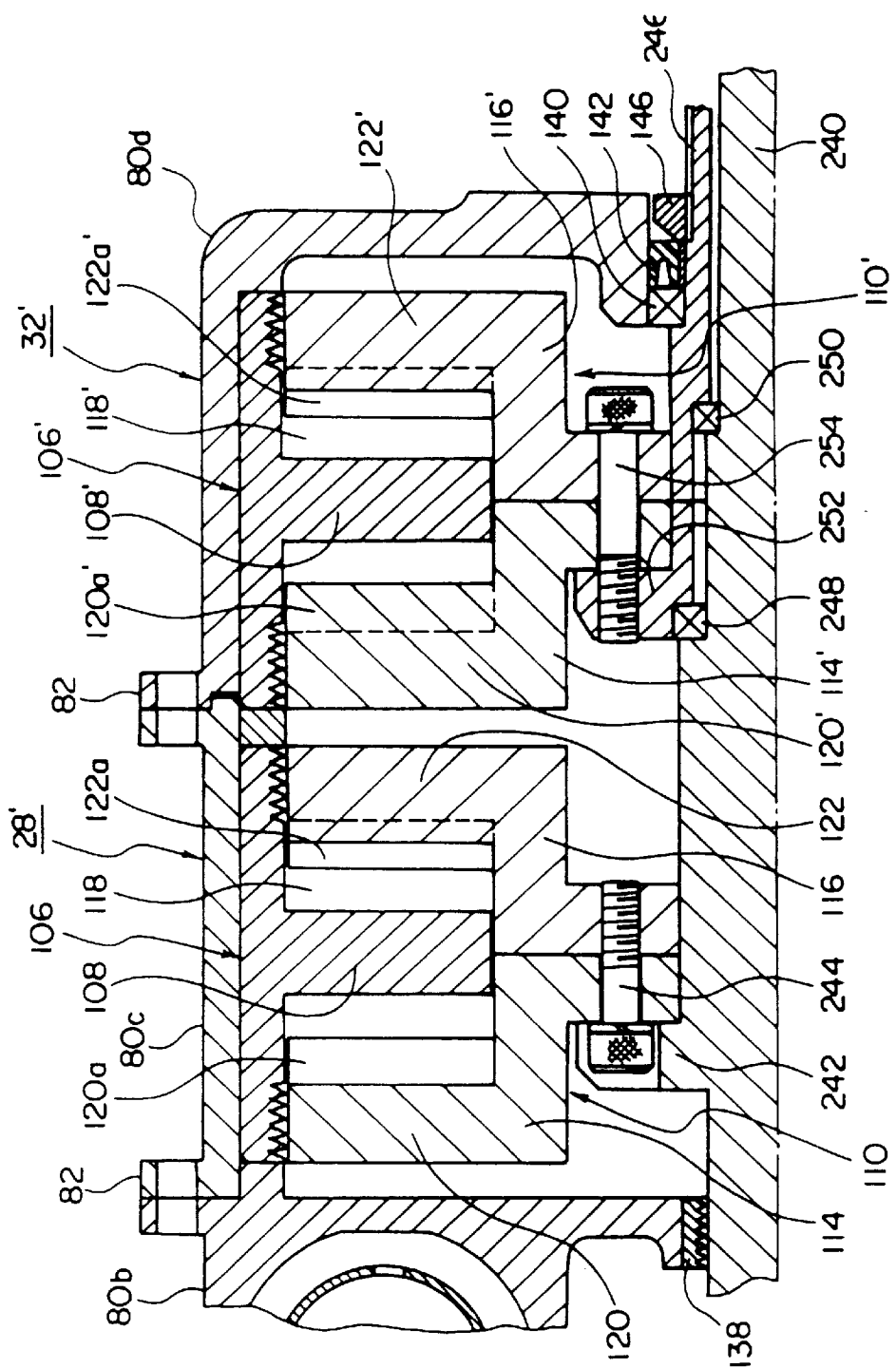
FIG. 12 is a cross sectional view of a modified form of the gas turbine shown in FIG. 2.

In FIGS. 1, 10 and 11, when key switch 67 is closed, output interface 228 generates output signal 68c, which is applied to power controller 20e. At this instant, power controller 20e converts DC power from battery 20g to AC power, which drives generator/motor 20a as a startor motor to rotate compressor 24, and first and second flywheel turbines 28 and 32. During this start-up operation, since throttle 98 (see FIG. 2) is closed, whereby the pumping action of throttle 98 is minimized to assist easy acceleration of rotary components. When speed signal 36a reaches a certain value, input interface 220 and CPU 224 causes output interface 228 to generate drive signal Dl for thereby turning on transistors TR1 and TR2. In this instance motor 70, ignition plug 42, fuel supply valve 44, circulation pump 54 and high pressure pump 56 are turned on, thereby starting the operation of gasturbine 18. The hot exhaust is then delivered to HRU 34, by which waste heat is recovered and stored to produce second motive gases for driving secondary flywheel turbine 32. In this instance, the storage temperature of HRU 34 inceases as shown in FIG. 11. After the start-up operation has been completed, power controller 20e is changed over to rectifier mode to charge battery 20g. If manual operator 64 is actuated, then power converter 20f is caused to serve as inverter circuit to supply AC power to motor/generator 20b for driving wheels via trans-axle 20c. When manual operator 64 is further depressed, peak demand signal 64a is applied to input interface 220. In this instance, CPU 224 causes output interface 230 to turn on transistor TR3. Therefore, water pump 48 is operated and water supply valve 46 is opened to enable water injection into combustor 24, thereby increasing the power output generated by primary flywheel turbine 28. At the same time, clutch 20d is energized by output signal 68b, thereby coupling generator/motor 20a to motor/generator 20b to assist the basic power of motor/generator 20b. During light load condition, peak power demand signal 64a is ceased to disengage clutch 20d. Under these conditions, when the pressure in accumulator 57 reaches 500 bar, or when the thermal storage unit of HRU 34 reaches the temperature of 280° C. (viz., T2 at time instant t1 in FIG. 11), output interface 228 turns off transistors TR2 and TR3. Accordingly, the ignition plug 42, fuel supply valve 44 and motor 70 are turned off. Under this circumstance, throttle 98 is closed and fuel to nozzle 38 is shut off. Thus, the pumping effect of compressor 24 is minimized and power to be consumed by compressor 24 is reduced. In this instance, output shaft 26 receives the kinetic energy stored by primary turbine 28 and also power output generated by secondary flywheel turbine 32, enabling continuous operation of generator/motor 20a to supply electric power to motor/generator 20b. When, on the other hand, the pressure in accumulator reaches 20 bar, or when HRU 34 reaches the temperature of 130° C. (viz., T1 at time instant t2 in FIG. 11), output interface 228 generates drive signal D2 to turn on transistor TR2 by which combustor 24 is again turned to supply hot exhaust to HRU while obtaining additional power output by primary flywheel turbine 28. In this manner, gas turbine 18 is intermittently operated while the kinetic energy stored in primary flywheel turbine 28 is transferred to output shaft 26 to which the power output continuously generated by secondary flywheel turbine 32 is also applied, thereby continuously driving generator/motor 20a. If, in this instance, brake signal 65 is applied to input interface 220, then output interface 228 changes over power controller 20f to its rectifier mode so that battery 20g is charged by electric powers generated by generator/motor 20a and motor/generator 20b.

It will now be appreciated from the foregoing description that a vehicle driving method and hybrid propulsion system according to the present invention make it possible to provide a hybrid vehicle which has a greater fuel economy with a remarkable reduction in pollutants in exhaust gases.

What is claimed is:

1. A method of driving a vehicle including a heat engine for generating a first power output and discharging hot exhaust, an expansion turbine coupled to said heat engine via an output shaft for generating a second power output, a heat recovery unit including thermal storage means for recovering and storing heat of said hot exhaust to produce motive gases, and a control unit for controlling the operation of said heat engine, comprising the steps of:
   operating said heat engine to produce said first power output;
   supplying said hot exhaust to said heat recovery unit for thereby recovering and storing heat of said hot exhaust by said thermal storage means to produce said motive gases;
   applying said motive gases to said expansion turbine to generate said second power output;
   controlling the operation of said heat engine in an on/off mode to intermittently supply said hot exhaust to said thermal storage means; and
   driving said vehicle with the use of at least one of said first and second power outputs.

2. A method of claim 1, and further comprising the steps of:
   detecting the temperature of said thermal storage means to generate a temperature signal;
   said controlling step enabling intermittent operation of said heat engine in response to said temperature signal so as to maintain said thermal storage means within a predetermined temperature range.

3. A hybrid propulsion system for a vehicle, comprising:
   a gas turbine for generating a first power output and discharging hot exhaust;
   an expansion turbine for generating a second power output;
   an output shaft coupled to said gas turbine and said expansion turbine for driving said vehicle;
   heat recovery means including thermal storage means for recovering and storing heat of said hot exhaust to generate motive gases in a closed circuit to operate said expansion turbine; and
   a control unit for operating said gas turbine in an on/off mode to intermittently supply said hot exhaust to said thermal storage means.

4. A hybrid propulsion system according to claim 3, further comprising:
   temperature sensing means for detecting temperature of said thermal storage means to generate a temperature signal;
   said control unit being responsive to said temperature signal for intermittently operating said gas turbine so as to maintain said thermal storage means within a predetermined temperature range.

5. A hybrid propulsion system according to claims 3 or 4, further comprising a turbine housing enclosing said gas turbine and said expansion turbine in axially spaced and concentric relationship.

6. A hybrid propulsion system according to claims 3 or 4, in which said gas turbine comprises an annular stator including at least one radially and inwardly extending flow deflector, a flywheel turbine rotatably disposed in said annular stator and having its outer periphery formed with an annular jet stream path and a plurality of circumferentially spaced turbine blades facing said annular path, said annular path accommodating said flow deflector.

7. A hybrid propulsion system according to claim 6, in which said expansion turbine comprises an annular stator including at least one radially and inwardly extending flow deflector, and a flywheel turbine having its outer periphery formed with an annular jet stream path and a plurality of circumferentially spaced turbine blades facing said annular path, said annular path accommodating said flow deflector.

8. A hybrid propulsion system according to claim 7, in which said output shaft comprises a first hollow shaft coupled to said expansion turbine and a second shaft coupled to said gas turbine and extending through said first hollow shaft.

9. A hybrid propulsion system for a vehicle, comprising:
   a turbine housing;
   a compressor mounted on said turbine housing to supply compressed air;
   combustor means for combusting air and fuel to produce first motive gases;
   first and second annular stator means fixedly mounted in said turbine housing in axially spaced relationship and each including an inlet to introduce a jet stream in a tangential direction, an outlet to exhaust expanded gases and at least one radially and axially extending flow deflector to deflect said jet stream;
   first and second turbine rotors rotatably disposed in said first and second annular stators to produce first and second power outputs, respectively and coupled to a common output shaft, each of said first and second turbine rotors including on its outer periphery formed with an annular jet stream path communicating with said inlet and said outlet to allow said jet stream to run therebetween and accommodating therein said flow deflector, and a plurality of turbine blades formed adjacent said annular path;
   said first stator means introducing said first motive gases and discharging said expanded gases as hot exhaust;
   heat recovery means including thermal storage means for recovering and storing heat of said hot exhaust to thereby produce second motive gases to be applied to the inlet of said second stator means; and
   control means for operating said combustor means in an on/off mode to cause said hot exhaust to be intermittently supplied to said thermal storage means.

10. A hybrid propulsion system according to claim 9, further comprising throttle means movably disposed in said turbine housing and actuated by said control means to minimize pumping action of said compressor during non-operation period of said combustor means.

11. A hybrid propulsion system according to claim 9, in which said first and second turbine rotors comprise first and second flywheels, respectively, each of said first and second flywheels including a pair of rotor disks fixedly supported by said output shaft, each of said rotor disks including a radially extending annular wall formed with said turbine blades facing said annular path.

12. A hybrid propulsion system according to claim 11, in which each of said turbine blades has a first surface to introduce said jet stream deflected by said flow deflector, an intermediate surface upon which said jet stream impinges, and a second surface contiguous with said intermediate surface for guiding said jet stream toward said annular path.

13. A hybrid propulsion system according to claims 9 or 10, in which said combustor means comprises a substantially semi-circular combustion chamber disposed in said turbine housing, a pre-evaporation and pre-mixing duct mounted at an entrance of said combustion chamber, a fuel nozzle mounted in said duct.

14. A hybrid propulsion system according to claim 13, in which said combustor means further comprises an injection nozzle mounted in said combustion chamber downstream of said duct to effect injection of water or vapor thereinto.

15. A hybrid propulsion system according to claim 14, further comprising means for recycling vapors contained in said hot exhaust.

16. A hybrid propulsion system for a vehicle, comprising:
a gas turbine including a turbine housing, compressor means mounted in said turbine housing, combustor means communicating with said compressor means to produce primary motive gases, a primary expansion turbine driven by said primary motive gases to produce a power output, and an output shaft coupled to said primary expansion;

control means for operating said gas turbine in an on/off mode;

said gas turbine including primary annular stator means fixedly mounted in said turbine housing and having an inlet to introduce a jet stream of said primary motive gases into said stator means in a tangential direction, at least one flow deflector radially and inwardly extending to deflect said jet stream and an outlet to exhaust hot exhaust, and said primary expansion turbine including a flywheel having its outer periphery formed with an annular jet stream path to allow said jet stream and a plurality of circumferentially spaced turbine blades formed adjacent said annular path, said annular path receiving said flow deflector of said stator means.

17. A hybrid propulsion system according to claim 16, further comprising:

heat recovery means including thermal storage means for recovering and storing heat of said hot exhaust to produce secondary motive gases;

secondary annular stator means fixedly mounted in said turbine housing in axially spaced relationship from said primary stator means to introduce said secondary motive gases in a tangential direction; and a secondary expansion turbine rotatably disposed in said secondary stator means and including a flywheel connected to said output shaft and having an annular jet stream path to introduce said jet stream of said secondary motive gases and turbine blade means formed adjacent said annular path for expansion of said secondary motive gases.

* * * * *